May 2, 1933.  E. R. PENICK  1,906,715

BEARING

Original Filed Oct. 4, 1929

Inventor
Edward R. Penick

By Hardway Cathey
Attorneys

Patented May 2, 1933

1,906,715

UNITED STATES PATENT OFFICE

EDWARD R. PENICK, OF HOUSTON, TEXAS

BEARING

Substitute for application Serial No. 397,185, filed October 4, 1929. This application filed December 4, 1930. Serial No. 500,037.

This invention relates to new and useful improvements in a bearing, and is a substitute for my earlier application Serial Number 397,185 filed October 4, 1929.

One object of the invention is to provide a bearing of the character described, constructed, and equipped with means, for maintaining a compressed air cushion, or film, about the relatively rotatable shaft, or other element, in said bearing.

Another object of the invention is to provide a bearing for a rotatable part, or shaft, therein of such construction that compressed air may be used as a lubricant, and such lubricant may be so applied as to maintain the metal parts of the shaft and bearing out of direct contact.

A further object of the invention is to provide a construction of the character described whereby a film of air, under compression, may be distributed uniformly around the rotating shaft, or other rotating part within the bearing.

With the above and other objects in view this invention has particular relation to certain novel features of construction, arrangement of parts and use, an example of which is given in this specification and illustrated in the accompanying drawing, wherein:—

Figures 1, 2:
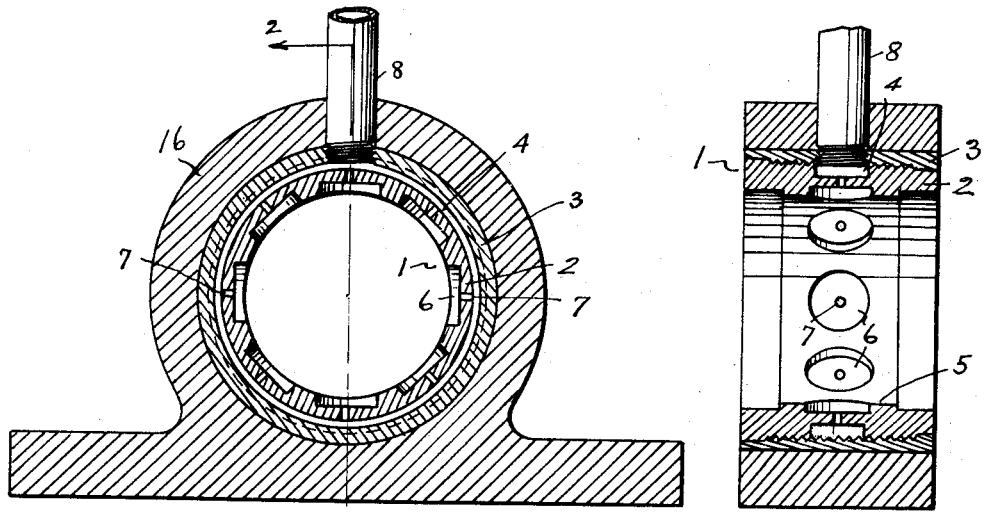
Figure 1 shows a transverse sectional view of the bearing.
Figure 2 shows a longitudinal sectional view taken on the line 2—2 of Figure 1.

Referring now more particularly to the drawing, wherein like numerals of reference designates similar parts in each of the Figures, the numeral 1 designates the bearing, as a whole, which may be composed of the inner and outer sleeves 2, 3. In the form shown the inner sleeve is tapered and externally threaded and the inside of the outer sleeve is threaded and has a corresponding taper to the taper of the sleeve 2 and is screwed thereon. Between said sleeves there is an annular channel, formed in one of them and forming an enclosed chamber 4 around the bearing member.

Around the inner wall of the inner sleeve, and preferably spaced from each end thereof, there is a slightly elevated rib, 5 which has an annular row of, preferably circular, pockets or cavities, 6, and ports 7, leading from the chamber 4 into said cavities. A pressure line 8 is threaded into the outer sleeve 3 and through it compressed air may be introduced into the chamber 4.

A shaft, as 9, is adapted to run in the bearing and will fit snugly within the belt like rib 5 thereof with only sufficient clearance between said shaft and rib to provide space for a film of compressed air about said shaft. The air under compression will pass from the chamber 4 through the ports 7 into the pockets 6 and thence in a film or sheet out between the shaft and rib 5, thus holding the shaft out of direct contact with the metal of the bearing, and in effect lubricating the bearing. When the air passes out beyond the rib 5 the pressure will be relieved and the air will be permitted to quickly escape.

In the form shown in Figures 3 and 4, the inner and outer sleeves 2', 3' are assembled in substantially the same manner as in Figures 1 and 2 and the bearing 1' of this form has the annular inclosed chamber 4' with the internal annular elevation or rib 5' provided with the pockets 6' and the ports 7' leading into said pockets from the chamber 4' in the same manner and for the same purpose as hereinabove described in connection with Figures 1 and 2. For the purpose of preventing endwise movement of the shaft 9 said shaft has an annular flange 10 formed integrally therewith which abuts one end of said bearing and the end thrust plate 11 fixed thereto which abuts the other end of said bearing. The ends of the bearing have the pockets 12 therearound with the channels 13 leading from the chamber 4' into said pockets 12. There is a sufficient clearance between the ends of the bearing 1' and the flange 10 and thrust plate 11 to admit a film of air under compression. The compressed air will pass through the ports 7' into the cavities or pockets 6' and will pass thence in annular sheets from each of the pockets 6' between the shaft and the annular elevation 5' forming a film or sheet of air all the way around the shaft 9 and between it and the elevation 5' and will pass thence into the annular spaces 14 and from them out through the channels 15 in the ends of the bearing 1'. The compressed air will also pass through the channels 13 into the pockets 12 and from these will pass in a film or sheet between the ends of the bearing 1' and flange 10 and thrust plate 11 respectively, thus in effect, lubricating the bearing and supplying a film of air, under compression, between the metal parts thus holding said parts at all times out of direct contact.

Figures 3, 4:
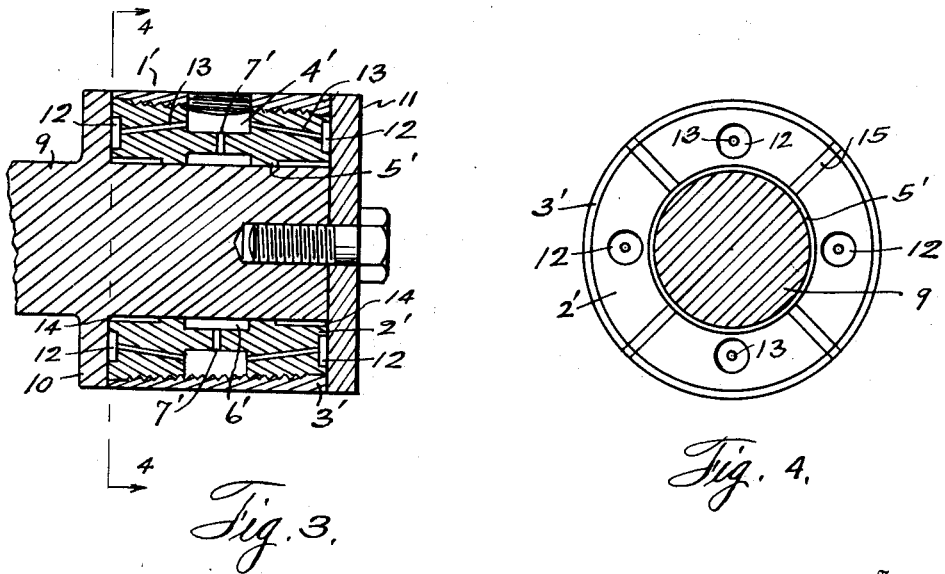
Figure 3 shows a longitudinal sectional view of another embodiment thereof.
Figure 4 shows a cross sectional view taken on the line 4—4 of Figure 3.

The bearings, in practice, will be mounted in alignment in suitable journals as 16, and the shaft 9 mounted therein, one, at least, of said bearings being of the construction shown in Figure 3 to retain the shaft against endwise movement.

The drawing and description disclose what is now considered preferred forms of the invention by way of illustration only while the broad principle of the invention will be defined by the appended claims.

What I claim is:

1. A bearing member having a bearing therein formed with an internal annular, belt-like, rib, a rotatable member in said bearing, said bearing member having air channels leading into the bearing around the rotatable member therein and which terminate to enlarged pockets in said rib.

2. The combination with a bearing member having a bearing and provided with an enclosed air chamber in said member, of a relatively rotatable member in the bearing, there being ports leading inwardly from said chamber into the bearing about the rotatable member, the inner ends of said ports terminating in enlarged pockets about said rotatable member.

3. The combination with a bearing member having a bearing and provided with an enclosed air chamber therein, of a relatively rotatable member in the bearing, there being ports from said chamber into the bearing about the rotatable member, end abutments on said rotatable member adjacent the respective ends of said bearing member, said bearing member having end pockets and also having channels leading from said chamber into said end pockets.

4. The combination with a bearing member having a bearing and provided with an enclosed air chamber therein, of a relatively rotatable member in the bearing, there being ports from said chamber leading inwardly into the bearing about the rotatable member, said bearing having an internal annular rib around the rotatable member, provided with pockets around the rotatable member, in which the inner ends of said ports terminate.

5. The combination with a bearing member having a bearing and provided with an enclosed air chamber therein, of a relatively rotatable member in the bearing, there being ports from said chamber into the bearing about the rotatable member, end abutments on said rotatable member adjacent the respective ends of said bearing member, there being air outlet channels between the bearing ends and the adjacent abutments.

In testimony whereof I have signed my name.

EDWARD R. PENICK.